United States Patent
Chane-Ching

(10) Patent No.: US 7,569,613 B2
(45) Date of Patent: Aug. 4, 2009

(54) AQUEOUS DISPERSION OF A RARE EARTH PHOSPHATE, AND A PROCESS FOR ITS PREPARATION

(75) Inventor: Jean-Yves Chane-Ching, Eaubonne (FR)

(73) Assignee: Rhodia Electronics & Catalysis, La Rochelle (FR)

( * ) Notice: Subject to any disclaimer, the term of this patent is extended or adjusted under 35 U.S.C. 154(b) by 0 days.

(21) Appl. No.: 11/728,657

(22) Filed: Mar. 27, 2007

(65) Prior Publication Data

US 2007/0179203 A1 Aug. 2, 2007

Related U.S. Application Data

(62) Division of application No. 10/433,762, filed as application No. PCT/FR01/03874 on Dec. 7, 2001, now abandoned.

(30) Foreign Application Priority Data

Dec. 8, 2000 (FR) .................... 00 16004

(51) Int. Cl.
- C01B 25/37 (2006.01)
- C01B 25/45 (2006.01)
- C01F 17/00 (2006.01)
- B01J 13/00 (2006.01)
- C09K 11/70 (2006.01)
- C09K 3/14 (2006.01)

(52) U.S. Cl. ............... 516/89; 524/403; 106/14.12; 106/286.1; 252/301.4 P

(58) Field of Classification Search ............ 516/89; 106/14.12, 286.1; 524/403; 423/263; 252/584, 252/301.4 P See application file for complete search history.

(56) References Cited

U.S. PATENT DOCUMENTS

| | | | |
|---|---|---|---|
| 5,198,487 A | | 3/1993 | Kiesel ............ 524/403 |
| 5,340,556 A | * | 8/1994 | Collin et al. ........ 252/301.4 P |
| 5,391,959 A | * | 2/1995 | Labib et al. ........ 252/301.4 P |
| 5,470,503 A | * | 11/1995 | Braconnier ........ 252/301.4 P |
| 5,716,547 A | | 2/1998 | David |
| 7,122,581 B1 | * | 10/2006 | Braconnier ............ 516/89 |
| 7,169,820 B2 | * | 1/2007 | Chane-Ching ........... 516/89 |

FOREIGN PATENT DOCUMENTS

| | | | |
|---|---|---|---|
| EP | 0 902 103 A1 | * | 3/1999 |
| EP | 0902103 A1 | | 3/1999 |
| WO | WO 00/76918 A1 | | 12/2000 |

OTHER PUBLICATIONS

PTO 06-1727, English Language translation of WO 00/76918 A1 (Jan. 2006), USPTO, Wash., DC, pp. Title page & 1-18.*

Boakye et al: "Porous Aluminum Oxide and Lanthanum Phosphate Fiber Coatings", Proceedings of the 1996 20th Annual Conf. on Composites Advanced Ceramics, Materials and Structures BI Cocoa Beach, FL., Janh 1-1996, vol. 17, No. 4, 1996, pp. 53-60; XP 00212977 Ceram. Eng. Sci Proc; Ceram. Eng. & Sci. Proceedings 1996 American Ceramic SRC.*

Chemical Abstracts online: AN 59:44879, Columbus, OH, abstract—Pajakoff, Sw., "Complex formation and valence effects in analysis of the rare earth elements", Monatshefte fuer Chemie (1963-month unavailable), 94(2), pp. 400-405.*

* cited by examiner

*Primary Examiner*—Daniel S Metzmaier
(74) *Attorney, Agent, or Firm*—Buchanan, Ingersoll & Rooney P.C.

(57) ABSTRACT

The invention concerns an aqueous colloidal dispersion of isotropic particles of a phosphate of at least one rare earth and is characterized in that it comprises either a complexing agent with a pK (cologarithm of the dissociation constant of the complex formed by the complexing agent and said rare earth) of more than 2.5; or an anion of a monobasic acid, soluble in water and with a pKa in the range 2.5 to 5; or said complexing agent and/or said anion of a monobasic acid. In the case of cerium and lanthanum, the mean particle size is at most 20 nm. The dispersions can have a degree of colloid agglomeration of less than 40%. This dispersion can be prepared by forming an aqueous mixture comprising at least one rare earth salt and the complexing agent or monobasic acid anion; by adding a base then phosphate ions to the mixture formed; and heating the mixture obtained. A precipitate is obtained that is re-dispersed in water.

9 Claims, No Drawings

AQUEOUS DISPERSION OF A RARE EARTH PHOSPHATE, AND A PROCESS FOR ITS PREPARATION

This application is a divisional of U.S. application Ser. No. 10/433,762, filed on Sep. 22, 2003, now abandoned, which was filed under 35 U.S.C. §371 based on International Application No. PCT/FR01/03874, filed on Dec. 7, 2001.

The present invention relates to an aqueous colloidal dispersion of a rare earth phosphate, and to a process for its preparation.

Great advances are currently being made in the fields of luminescence and electronics. Examples of such developments that can be cited are the development of plasma systems (screens and lamps) for new visual display and lighting devices. Such novel applications require luminophores with ever improving properties. In addition to their luminescence, those materials are required to exhibit specific morphology or grain size characteristics, to facilitate their use in the applications under consideration.

More precisely, luminophores are required to be in the form of very fine particles that are distinct and as separate as possible.

Sols or colloidal dispersions can constitute an advantageous route to such products.

The present invention aims to provide a sol that can in particular be used in the fields of luminescence and electronics from which fine, properly disaggregated products can be obtained.

To this end, the dispersion of the invention is an aqueous colloidal dispersion of isotropic particles of a phosphate of at least one rare earth and is characterized in that it comprises either a complexing agent with a pK (cologarithm of the dissociation constant of the complex formed by the complexing agent and said rare earth) of more than 2.5; or an anion of a monobasic acid, soluble in water and with a pKa in the range 2.5 to 5; or said complexing agent or said anion as a mixture, and in which the degree of colloidal agglomeration is less than 40%, more particularly less than 10%.

In a further variation, the dispersion of the invention is an aqueous colloidal dispersion of isotropic particles of a phosphate of at least one rare earth and is characterized in that it comprises either a complexing agent with a pK (cologarithm of the dissociation constant of the complex formed by the complexing agent and said rare earth) of more than 2.5; or an anion of a monobasic acid, soluble in water and with a pKa in the range 2.5 to 5; or said complexing agent or said anion as a mixture, with the exception of dispersions of cerium phosphate, lanthanum phosphate or cerium and lanthanum phosphate.

Finally, in a third variation, the dispersion is an aqueous colloidal dispersion of isotropic particles of a phosphate of cerium and/or lanthanum and is characterized in that it comprises either a complexing agent with a pK (cologarithm of the dissociation constant of the complex formed by the complexing agent and said rare earth) of more than 2.5; or an anion of a monobasic acid, soluble in water and with a pKa in the range 2.5 to 5; or said complexing agent or said anion as a mixture, and in that the mean particle size is at most 20 nm.

The size of the particles of the dispersion of the invention can be of the order of a few nanometers, with a homogeneous, distinct and separated morphology, rendering the dispersion particularly useful for applications employing luminophores.

Further characteristics, details and advantages of the invention will become clearer from the following description and non-limiting examples intended to illustrate the invention.

The term "rare earth" as used in the description means elements from the group formed by yttrium and elements from the periodic table with an atomic number in the range 57 to 71 inclusive.

The invention is applicable to dispersions or sols of particles of a phosphate of one or more rare earths. This means particles essentially based on orthophospates with formula $LnPO_4$, Ln meaning one or more rare earths.

Further, throughout the description, the expression "colloidal dispersion" or "sol" of a rare earth phosphate means any system constituted by fine solid particles of colloidal dimensions generally based on a rare earth phosphate as defined above, which may be hydrated, and in suspension in an aqueous liquid phase. These particles can also contain a certain quantity of a complexing agent or an anion of the monobasic acid defined above. They can optionally also contain residual quantities of bound or adsorbed ions that may originate from rare earth salts used in preparing the dispersion, such as nitrate, acetate, chloride, citrate, ammonium anions or sodium ions, or phosphate anions ($HPO_4^{2-}$, $PO_4^{3-}$, $P_3O_{10}^{5-}$...). It should be noted that in such dispersions, the rare earth can either be completely in the form of colloids, or simultaneously in the form of ions, complexed ions and colloids. Preferably, at least 80% of the rare earth is in the colloidal form.

The aqueous liquid phase can also comprise the complexing agent or monobasic acid or the anion of this acid, the anions defined above of the rare earth salts and vanadate ions or phospho-vanadate ions in various forms.

The term "complexing agent" as used in the present description means a compound or molecule that can establish a covalent or iono-covalent bond with the rare earth cation. Suitable complexing agents for use in the present invention are complexing agents with a high complex dissociation constant Ks, the complex considered here being the complex formed by the complexing agent and the rare earth cation. By way of example, for the equilibrium given below:

$$(Ln,I)^{(3-x)+} = Ln^{3+} + I^{x-}$$

where Ln designates a rare earth, I the complexing agent and I- the complexing anion, x being equal to 1, 2 or 3 depending on the ionisation state of the complex.

The dissociation constant of the complex Ks is given by the formula:

$$Ks = [Ln^{3+}] \times [I^{x-}] / [(Ln,I)^{(3-x)+}]$$

The pK is the cologarithm of Ks. The more stable the complex $(Ln,I)^{(3-x)+}$, the higher the value of pK.

Suitable complexing agents for use in the context of the present invention are those with a pK of more than 2.5, preferably at least 3.

The complexing agent can in particular be selected from acid-alcohols or polyacid-alcohols or their salts. Examples of acid-alcohols that can be cited are glycolic acid or lactic acid. Malic acid and citric acid are examples of polyacid-alcohols.

The complexing agent can also be selected from aliphatic amino acids, preferably aliphatic amino polyacids, or salts thereof. Examples of such a complexing agent are ethylene-diamino-tetraacetic acid or nitrilo-triacetic acid, or the sodium salt of N,N-diacetic glutamic acid with formula (Na-COO$^-$)CH$_2$CH$_2$—CH(COONa)N(CH$_2$COO$^-$Na)$_2$.

Other suitable complexing agents that can be used are polyacrylic acids and their salts such as sodium polyacrylate, more particularly those with a mass average molecular weight in the range 2000 to 5000.

The complexing agent can be either in the acid or in the ionised form.

Finally, it should be noted that one or more complexing agents can be present in the same dispersion.

In accordance with the invention, the dispersion can also comprise the anion of a monobasic acid, soluble in water and with a pKa in the range 2.5 to 5. This acid can in particular be formic acid, propionic acid or monochloroacetic acid. More particularly, it can be acetic acid. Here again, a plurality of monobasic acid anions can be present in the same dispersion.

As indicated above, the complexing agent and the above anion can be present in the dispersion as a mixture.

The amount of complexing agent and/or monobasic acid anion, expressed as the number of moles of complexing agent or monobasic acid anion with respect to the number of atoms of rare earth, can in particular be between 0.01 and 0.25, more particularly between 0.05 and 0.21. This amount is determined by chemical assay of the carbon and the rare earth in colloids recovered after ultracentrifuging at 50000 rpm for 6 hours. Such an amount is applicable to the sum of the complexing agents or anions if the dispersion contains a plurality of complexing agents or anions.

The dispersions of the invention are nanometric in type. This means dispersions in which the colloidal size is generally at most about 250 nm, in particular at most 100 nm, preferably at most 20 nm and more particularly at most 10 nm. The colloidal particle size can in particular be in the range from about 3 nm to about 10 nm.

The above sizes are determined by HRTEM (high resolution transmission electron microscopy), if necessary complemented by cryomicroscopy.

In addition to their small size, the colloids of the dispersions of the invention are slightly agglomerated or not agglomerated at all. Transmission electron cryomicroscopic analysis on frozen samples (Dubochet technique) show a low degree of colloid agglomeration of, for example, less than 40%, more particularly less than 10%, preferably less than 5% in number, i.e., for the set of articles or particles observed, at least 60%, more particularly 90% and still more particularly at least 95% is constituted by a single crystallite.

Further, the colloidal particles are isotropic or substantially isotropic as regards their morphology. Their shape is close to that of a sphere (completely isotropic morphology) as opposed to particles in the acicular or platelet form.

More precisely, the particles can have a L/1 ratio of at most 5, preferably at most 4 and more particularly at most 3, L representing the longest dimension of the particle and 1 representing the smallest dimension.

The present invention is of particular application to the case in which the rare earth is lanthanum, cerium, praseodymium, gadolinium or yttrium. It is also of particular application to colloidal dispersions of ternary phosphates of lanthanum, cerium and terbium. Regarding these ternary phosphates, more particular mention can be made of those with formula $La_xCe_yTb_{1-x-y}PO_4$ in which x is between 0.4 and 0.7 inclusive and x+y is more than 0.7. The invention is also applicable to mixed phosphates of lanthanum and europium or of lanthanum and thulium or lanthanum, thulium and gadolinium. For phosphates containing thulium, the amount of thulium, expressed as the atomic % with respect to lanthanum, can be in the range 0.1 to 10, more particularly in the range 0.5 to 5, and for those containing gadolinium, the amount of this latter element, expressed as the atomic % with respect to lanthanum, can be in the range 10% to 40%, for example.

The concentrations of the dispersions of the invention are generally at least 15 g/l, in particular at least 20 g/l and more particularly at least 50 g/l, the concentrations being expressed as the equivalent concentration of rare earth oxide. The concentration is determined after drying and calcining a given volume of dispersion in air.

The process for preparing the dispersions of the invention will now be described.

This process exists in a number of variations.

In a first variation, the process is characterized in that it comprises the following steps:

bringing a colloidal dispersion of at least one rare earth compound comprising at least one complexing agent or an anion of said monobasic acid into contact with phosphate ions;

heating the medium obtained to obtain a precipitate;

separating the precipitate obtained and re-dispersing it in water, to obtain a colloidal dispersion.

In a second variation, the process is characterized in that it comprises the following steps:

bringing a colloidal dispersion of at least one rare earth compound comprising at least one complexing agent or an anion of said monobasic acid into contact with phosphate ions at least a portion of which is in the form of an alkaline tripolyphosphate;

heating the medium obtained to produce a colloidal dispersion.

The starting product for the process in any variation is a colloidal dispersion of at least one rare earth compound which also comprises the complexing agent and/or said monobasic acid anion.

This starting colloidal dispersion may have been obtained using any known means. Particular reference can be made to the processes described in European patent applications EP-A-0 206 906, EP-A-0 208 581, EP-A-0 316 205 which concern cerium-based dispersions. More particularly, it is possible to use colloidal dispersions obtained by thermohydrolysis of an aqueous solution of a cerium IV salt such as a nitrate, in particular in an acid medium. Such a process has been described in European patent application EP-A-0 239 477 or EP-A-0 208 580. Reference can also be made to European patent application EP-A-0 308 311, which concerns dispersions of trivalent rare earths, in particular yttrium. If necessary, the complexing agent and/or said monobasic acid anion is added to the dispersions obtained as described in those applications. In the dispersions described above or generally used, the rare earth is present in the form of an oxide and/or a hydrated oxide (hydroxide).

This colloidal dispersion can be prepared by forming an aqueous mixture comprising at least one rare earth salt and either said complexing agent or a monobasic acid, soluble in water and with a pKa in the range 2.5 to 5, or a mixture of complexing agent and monobasic acid; and by adding a base to the mixture formed.

The rare earth salts can be salts of inorganic acids or organic acids, for example of the sulphate, nitrate, chloride or acetate type. It should be noted that the nitrate and the acetate are particularly suitable. More particularly, the cerium salts can be cerium III acetate, cerium III chloride or cerium III nitrate or cerium IV nitrate and mixtures of these salts such as acetate/chloride mixtures.

In the case of the presence of a monobasic acid, the concentration of acid used is not critical and can thus be used in the diluted form, for example 1N, or more concentrated.

The base can be a product of the hydroxide type. Alkaline or alkaline-earth hydroxides and ammonia can be cited. It is also possible to use secondary, tertiary or quaternary amines. However, the amines and ammonia may be preferred since they reduce the risks of pollution by alkaline or alkaline-earth cations.

The base is added until a pH is reached the value of which depends on the nature of the rare earth and the nature and quantity of complexing agent. Note that the higher the complexing agent content, the lower the pH. In general, base is added until a pH is reached at which the precipitate formed in the first part of the base-addition step is observed to start dissolving.

In accordance with the process of the invention, for the first variation, phosphate ions are brought into contact with the starting colloidal dispersion.

The phosphate ions can be provided by means of pure compounds or compounds in solution, such as phosphoric acid, and phosphates of alkalis or other metallic elements. In this regard, sodium mono- or di-hydrogen phosphate should be mentioned. The phosphate ions are preferably added in the form of a solution of an ammonium phosphate which can, more particularly, be diammonium or monoammonium phosphate.

The next step of the process consists of heating the mixture obtained at the end of the preceding step. The heating temperature is at least 60° C., preferably at least 100° C., and it can rise to the critical temperature of the reaction medium. By way of example, it can be in the range 90° C. to 180° C.

Depending on the temperatures employed, this heating or heat treatment can be carried out either under normal atmospheric pressure or at a pressure such as the saturated vapour pressure correspond to the temperature of the heat treatment. When the temperature of this treatment is selected so as to be higher than the reflux temperature of the reaction mixture (i.e., generally, more than 100° C.), the operation is carried out by introducing the aqueous mixture into a closed vessel (closed reactor, usually termed an autoclave), the necessary pressure then results simply from heating the reaction medium (autogenous pressure). Under the temperature conditions given above, and in an aqueous medium, it is possible to specify, by way of illustration, that the pressure in the closed reactor is in the range from a value of more than 1 bar ($10^5$ Pa) to 165 bars ($165 \times 10^5$ Pa), preferably in the range 1 bar ($5 \times 10^5$ Pa) to 20 bars ($100 \times 10^5$ Pa). Clearly, it is also possible to exert an external pressure which then supplements that caused by heating.

Heating can be carried out either in an atmosphere of air, or in an inert gas atmosphere, preferably nitrogen if that is the case.

The treatment period is not critical, and can vary between wide limits, for example 1 to 48 hours, preferably 2 to 24 hours.

At the end of this heating step, a gel or precipitate is obtained.

The precipitate or gel obtained can be separated from the reaction medium using any suitable means, in particular filtering. The product is then taken up into dispersion in water and the dispersion or sol of the rare earth phosphate of the invention is then obtained. Advantageously, the precipitate from the reaction is washed. Washing can be carried out by adding water to the precipitate then, after stirring, separating the solid from the liquid medium, for example by ultracentrifuging. This operation can be repeated a number of times if required.

The dispersion obtained after adding water to form a suspension can be further purified and/or concentrated by ultrafiltration.

In order to increase the stability of the dispersion obtained, it is possible to add either an acid or a rare earth salt, or both (acid and salt) to the precipitate on taking it up into suspension in water, the rare earth being the same as that of the dispersion. When both acid and salt are added, addition may be successive. It may be an acid such as nitric acid, acetic acid, formic acid, citric acid, or an acetate in the case of a rare earth salt. This addition is carried out with stirring, optionally with heat. It can be matured for a period in the range from 15 minutes to 1 hour.

The second variation of the process will now be described in more detail.

This second variation differs from the first variation in that the phosphate ions are at least partially provided in the form of an alkaline tripolyphosphate, for example sodium tripolyphosphate ($Na_5P_3O_{10}$). More particularly, it is possible to use a mixture of an alkaline tripolyphosphate and ammonium phosphate. The number of moles of alkaline tripolyphosphate with respect to the total number of moles of phosphating agent can, for example, be in the range 25% to 75%.

A heating step is then carried out that is identical to that described for the first variation.

However, in contrast to the first variation, a colloidal dispersion is directly obtained from the heating step.

This dispersion can also be treated by ultrafiltration.

As before, the dispersion can be washed by separating the solid particles by ultracentrifuging then re-dispersing them in water and repeating the operation. When taking up the dispersion, it is also possible to use an acid or a rare earth salt as described above to increase the stability of the dispersion.

For the two variations described above, in one particular implementation, it is possible to adjust the pH of the medium obtained after bringing the phosphate ions and the starting rare earth oxide dispersion to a value of at least 10, preferably at least 12. This adjustment can be carried out by adding a base of the type described above. It can increase the yield of the phosphate forming reaction.

The dispersions of the invention can be used in a number of applications. Catalysis can in particular be mentioned. The dispersions can also be used for lubrication and in ceramics. Further, these dispersions can form part of the composition of suspensions for polishing. These suspensions can be used for polishing glass, for example in glass making, glazing, plate glass, television screens, spectacles, or for polishing ceramic substances or other vitreous ceramics. More particularly, these suspensions can also be used for CMP type polishing in the electronics industry. In this case, they are particularly suitable for polishing metallic substrates used in constituting microprocessors, these substrates possibly being formed from copper, aluminium, titanium nitride or tungsten.

Finally, regarding the morphology and fineness of the colloidal particles forming them, these dispersions are particularly suitable for use in preparing luminophore compounds or in manufacturing luminescent devices, of the field effect display, plasma system or mercury vapour type, for example. Luminophores used in manufacturing such devices are employed in known techniques, for example serigraphy, electrophoresis or sedimentation.

Examples will now be given.

EXAMPLE 1

This example concerns the preparation of a colloidal dispersion of $LaPO_4$.

28.3 cm³ of a solution of $La(NO_3)_3$ in a concentration of 1.65 mole/kg and with a density of 1.68 g/cm³ (78.4 mM of La) was introduced into a beaker followed by 15.7 g of citric acid and made up to 150 cm³ with demineralised water. 127 cm³ of 3N ammonia was then added at a constant flow rate, the addition time being 30 min. A colloidal dispersion of lanthanum hydroxide was obtained. The pH was 8.75.

A solution of ammonium phosphate was prepared by adding 9.75 g of $(NH_4)_2HPO_4$, and made up to 150 cm$^3$ with demineralised water.

The lanthanum dispersion and the phosphate solution were mixed. A gel was observed to form, with a fall in viscosity over time.

The pH was then brought to 12.5 by adding 120 cm$^3$ of 4M NaOH. It was stirred for 30 min.

The dispersion was then heat treated at 120° C. for 16 hours.

It was allowed to cool, then a 100 cm$^3$ aliquot was centrifuged at 4500 rpm for 10 min to recover the precipitate formed.

The residue was taken and made up to 100 cm$^3$/g with 1M $HNO_3$ then stirred for one hour.

It was centrifuged again at 4500 rpm for 10 min.

The residue was made up to 100 cm$^3$ with demineralised water.

It was centrifuged again at 4500 rpm for 10 min.

The residue was taken and made up to 100 cm$^3$ using a 0.1 M lanthanum acetate solution.

It was stirred for one hour.

It was centrifuged then the residue was taken and made up to 100 cm$^3$ using demineralised water.

A colloidal dispersion was obtained.

Transmission cryo-microscopy showed the presence of nanoparticles with an isotropic morphology with a size of about 3 to 5 nm.

Using an aliquot of well defined mass, $LaPO_4$ assay was carried out by loss on ignition: it was oven heated to 80° C. for 16 hours, then calcined at 900° C. for 2 hours. The dispersion was assayed at 1.3%, corresponding to a concentration of 0.055 M/l of $LaPO_4$.

The chemical composition of the colloids was determined by chemical assay after recovering them by ultracentrifuging at 50000 rpm for 6 hours. The residue was dried at ambient temperature.

The chemical assay carried out on the residue indicated an La concentration of 52.7% and a P concentration of 10.8%. This corresponded to a La/P atomic ratio of 1.1.

The percentage by weight of carbon was 2.15%, defining a C/La atomic ratio of 0.5 and a citrate/La mole ratio of 0.08.

EXAMPLE 2

This example concerns the preparation of a colloidal dispersion of $LaPO_4$.

15.7 g of Prolabo® citric acid $C_6H_8O_7,H_2O$ with a molecular mass MW=210.14 g, i.e., 0.074 moles of citric acid, was dissolved in 102 ml of water.

45.11 g (26.8 cm$^3$) of a solution of $La(NO_3)_3$ containing 26.98% of $La_2O_3$, i.e., 12.18 g of $La_2O_3$ or 0.074 moles of La, was then incorporated.

The citrate/La mole ratio was 1.

98.5 ml of 3.23 M/l $NH_4OH$ solution was then added at a flow rate of 2 ml/min at ambient temperature. The quantity of OH ions added corresponded to a OH/La moce ratio of 4.30.

It was stirred at room temperature for 2 h. The pH of the dispersion obtained was 8.5.

A phosphating mixture was then prepared containing sodium tripolyphosphate and diammonium phosphate in a NaTPP:$(NH_4)_2HPO_4$ mole ratio of 50:50.

This mixture was prepared by adding 3.78 g of sodium tripolyphosphate NaTPP with 7.82 M/kg of P to 3.908 g of $(NH_4)_2HPO_4$ in a beaker and making up to 150 ml with demineralised water. The phosphate solution was added all at once to the lanthanum dispersion prepared above at ambient temperature. The P/La mole ratio was 0.8. The pH was 8.7 after stirring for 15 min.

The pH was then brought to 12.5 using a 4 M/l NaOH solution (104 g). The dispersion obtained was immediately transferred to closed vessels (Parr bombs) and heated to 120° C. overnight in a preheated oven for 16 hours.

A colloidal dispersion that was transparent to the eye was obtained.

The colloidal dispersion was washed by ultrafiltering through 3 kD membranes. 200 cm$^3$ of demineralised water was added to 100 cm$^3$ of the dispersion from the heat treatment. It was ultrafiltered to a volume of 100 cm$^3$ and a further 200 cm$^3$ of demineralised water was added. It was ultrafiltered again to a final volume of 100 cm$^3$. Thus, the dispersion had been washed with 4 times its volume of water.

Transmission cryo-microscopy showed the presence of well disaggregated nanoparticles with an isotropic morphology with a size of about 5 nm. The degree of disaggregation, as defined above, was less than 5% and the ratio L/l of the particles as defined above was less than 3.

The chemical composition of the colloids was obtained by chemical assay of the colloids recovered after ultracentrifuging at 50000 rpm for 6 hours. Chemical assay of the residue after drying at 20° C. produced the following results:

La=47.4%; P=8.2%; C=3.89%;

defining the following mole ratios: La/P=1.29; C/La=0.95, and citrate/La=0.16.

EXAMPLE 3

This example concerns the preparation of a colloidal dispersion of $LaCeTbPO_4$.

104 g of $La(NO_3)_3$ in a concentration of 1.65 mole/kg (172 mM of La), then 8.33 ml of a solution of $Ce(NO_3)_3$ in a concentration of 3 mole/l (25 mM of Ce) were introduced into a beaker followed by 27.3 ml of 1.9 mol/l $Tb(NO_3)_3$ solution (52 mM of Tb). The corresponding composition of the oxide was then $(La_{0.69}Ce_{0.1}Tb_{0.21})O_3$.

52.5 g of Prolabo® citric acid $C_6H_8O_7,H_2O$ with a molecular mass MW=210.14 g, (250 mM) was then added and made up to 500 cm$^3$ with demineralised water.

135 cm$^3$ of 2.8 N ammoniacal solution was added at a constant flow rate to an aliquot of 200 cm$^3$ of the prepared mixture (100 mM La+Ce+Tb); the addition time was 30 min. The pH was 9.2 and a colloidal dispersion was obtained.

A solution of ammonium phosphate was obtained by adding 13.2 g of $(NH_4)_2HPO_4$ (100 mM) and made up to 200 cm$^3$ with demineralised water.

This solution was mixed with the lanthanum-, cerium- and terbium-based dispersion.

The pH was brought to 12.5 by adding 4M NaOH. It was stirred for 30 min.

The dispersion was heat treated at 120° C. for 16 hours.

It was allowed to cool and a 100 cm$^3$ aliquot was centrifuged at 4500 rpm for 10 min.

The residue was taken and made up to 100 cm$^3$/g with 1M $HNO_3$ and stirred for one hour.

It was centrifuged again at 4500 rpm for 10 min.

The residue was made up to 100 cm$^3$ with demineralised water.

It was centrifuged again at 4500 rpm for 10 min.

The residue was taken and made up to 100 cm$^3$ using a 0.1 M lanthanum acetate solution.

It was stirred for one hour.

It was centrifuged then the residue was taken and made up to 100 cm$^3$ using demineralised water.

A colloidal dispersion was obtained.

Transmission cryo-microscopy showed the presence of nanoparticles with an isotropic morphology with a size of about 3 to 5 nm.

The colloidal dispersion was luminescent, emitting a green coloration under UV excitation.

The invention claimed is:

1. An aqueous colloidal dispersion of isotropic particles of a phosphate of at least one rare earth, comprising: a complexing agent with a pK being the cologarithm of the dissociation constant of the complex formed by said complexing agent and said rare earth, of more than 2.5, wherein the complexing agent is an acid-alcohol, polyacid-alcohol, aliphatic amino acid, or a salt thereof; and said dispersion having a degree of colloidal agglomeration of less than 40% in number.

2. The dispersion according to claim 1, wherein the degree of colloidal agglomeration is less than 10% in number.

3. The dispersion according to claim 1, wherein the particles have a mean particle size of at most 20 nm.

4. An aqueous colloidal dispersion of isotropic particles of a phosphate of at least one of cerium and lanthanum, comprising: a complexing agent with a pK which is the cologarithm of the dissociation constant of the complex formed by said complexing agent and said rare earth, of more than 2.5, wherein the complexing agent is an acid-alcohol, polyacid-alcohol, aliphatic amino acid, or a salt thereof, wherein the particles have a mean particle size is at most 20 nm.

5. The dispersion according to claim 4, wherein said dispersion has a degree of colloid agglomeration of less than 40% in number.

6. The dispersion according to claim 1, wherein the rare earth phosphate is a phosphate of lanthanum, cerium and terbium.

7. The dispersion according to claim 4, wherein the rare earth phosphate is a phosphate of lanthanum, cerium and terbium.

8. The dispersion according to claim 1, wherein the rare earth phosphate is a phosphate of lanthanum and europium.

9. The dispersion according to claim 4, wherein the rare earth phosphate is a phosphate of lanthanum and europium.

* * * * *